Nov. 20, 1934.  W. W. BROWN  1,981,778

VALVE MECHANISM FOR ROTARY ENGINES

Filed July 23, 1929  2 Sheets-Sheet 1

William W. Brown
INVENTOR

BY Victor J. Evans
ATTORNEY

Nov. 20, 1934.  W. W. BROWN  1,981,778
VALVE MECHANISM FOR ROTARY ENGINES
Filed July 23, 1929  2 Sheets-Sheet 2
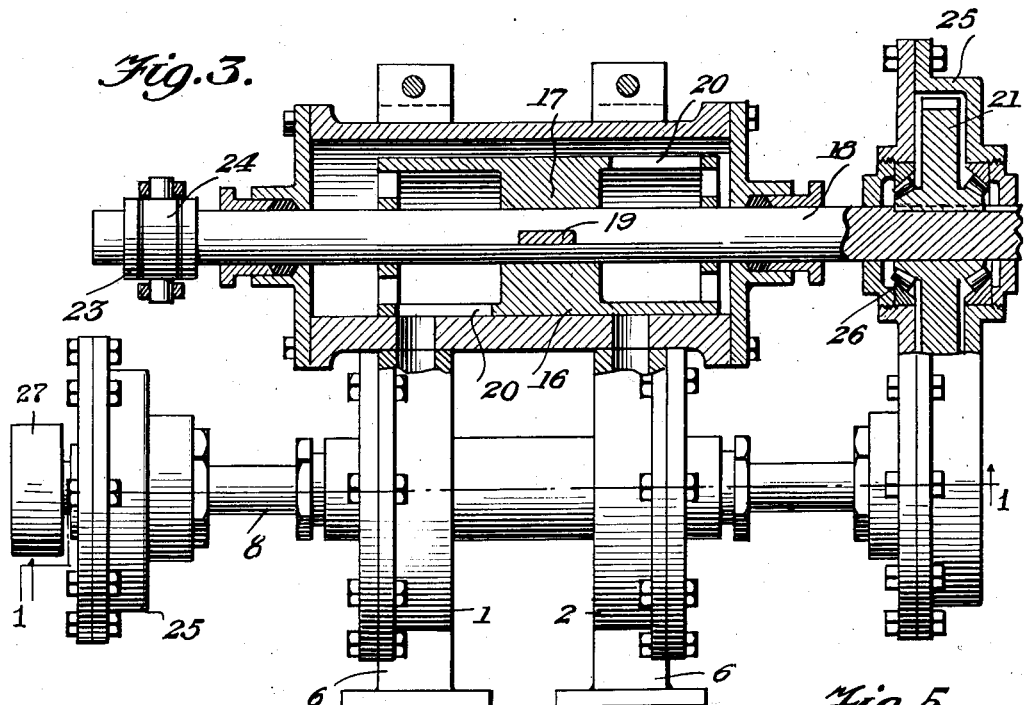
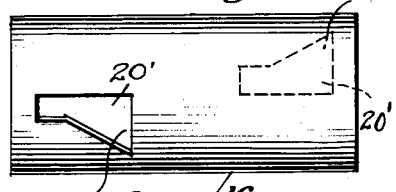
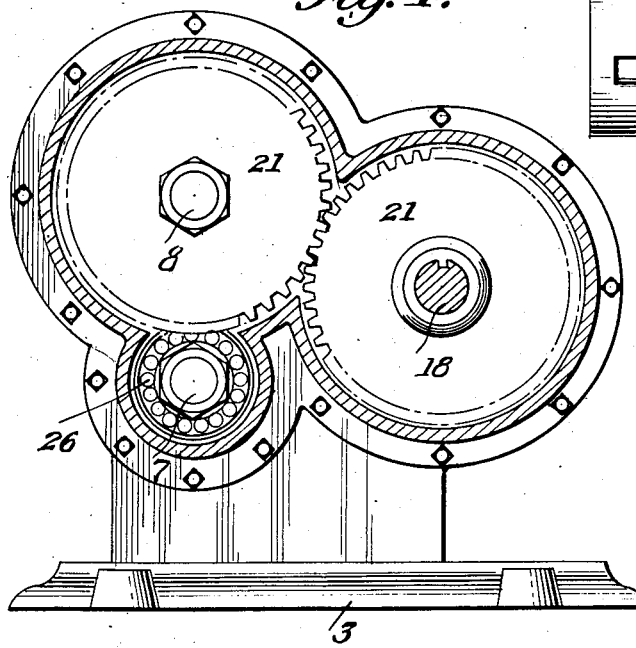
William W. Brown
INVENTOR
BY Victor J. Evans
ATTORNEY Patented Nov. 20, 1934

1,981,778

UNITED STATES PATENT OFFICE 1,981,778

VALVE MECHANISM FOR ROTARY ENGINES

William W. Brown, Blytheville, Ark.

Application July 23, 1929, Serial No. 380,327

1 Claim. (Cl. 121—70)

This invention relates to a valve mechanism for a rotary engine which is mainly designed for use with steam, the general object of the invention being to provide mechanism of this character wherein the same is adjustable for controlling the passage of the steam to the rotors so that the engine can be driven at different speeds.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 3 is a sectional view taken approximately on the line 3—3 of Figure 2 looking in the direction of the arrows.

Figure 4 is a sectional view on the line 4—4 of Figure 1.

Figure 5 is a view of the valve member.

Figure 1:
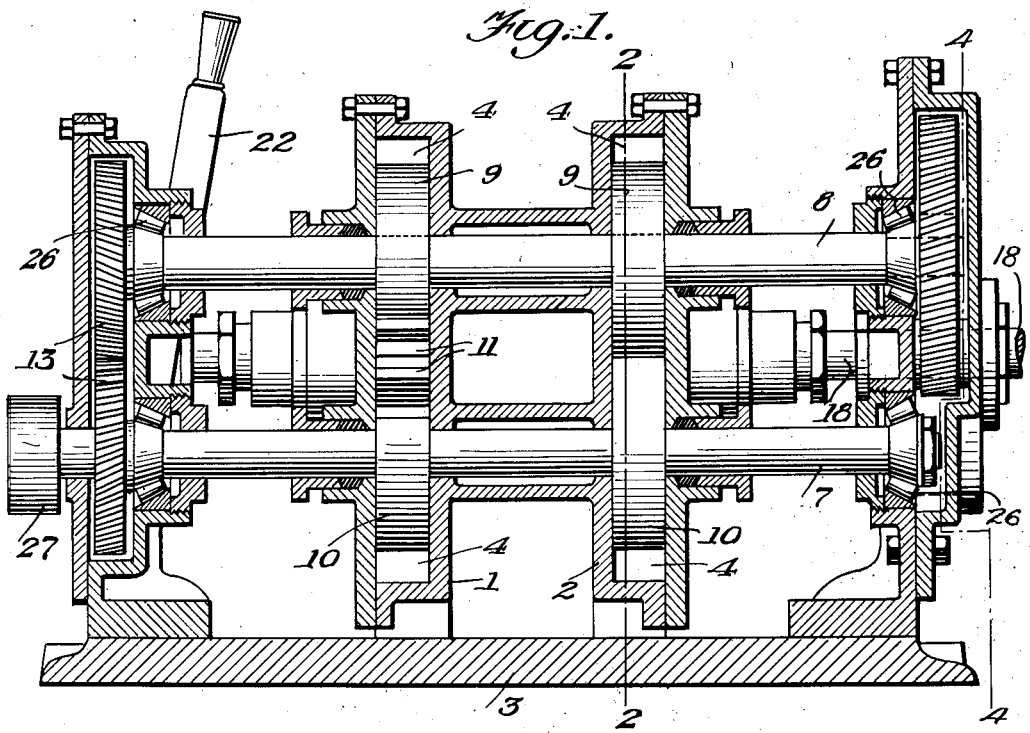
Figure 1 is a longitudinal sectional view through the improved engine, the section being taken on the line 1—1 of Figure 3 looking in the direction of the arrows.
Figure 2:
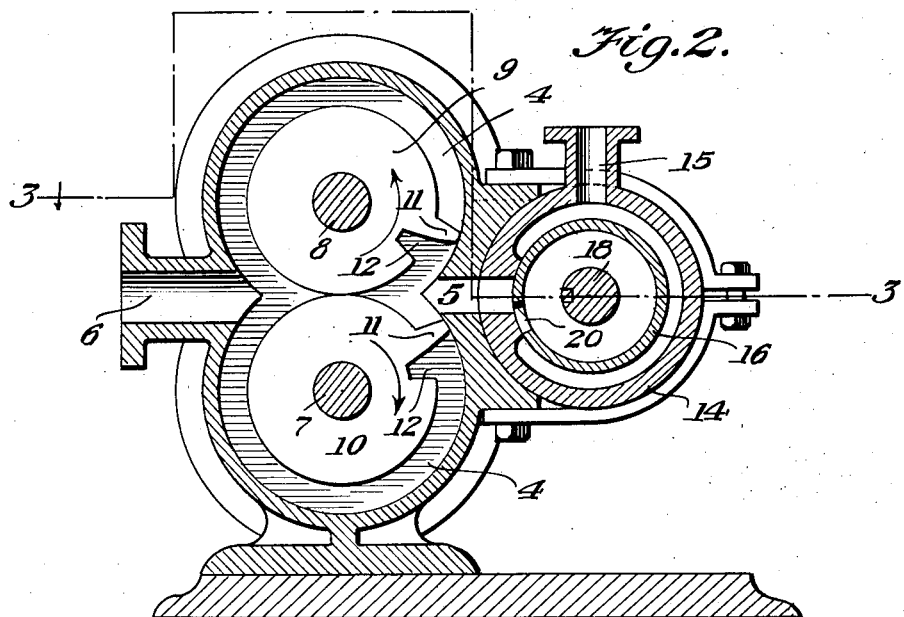
Figure 2 is a section on line 2—2 of Figure 1.

In these views, the numerals 1 and 2 indicate a pair of housings which are supported on the base 3, each housing being shaped to form upper and lower circular chambers 4 which are in communication with each other, as clearly shown in Figure 2. An inlet port 5 is formed in one side of each housing for delivering steam or other expansible fluid into the housing at the point of junction of the two chambers and an outlet port 6 is formed at the opposite side of each housing, this outlet port being of greater diameter than the inlet port. Shafts 7 and 8 pass through the housings, the lower shaft 7 passing through the lower chambers of the housing and the upper shafts passing through the upper chambers thereof. A pair of rotors 9 is fastened to the shaft 8 and a pair of rotors 10 is fastened to the shaft 7, the rotors on shaft 8 being arranged in the upper chambers of the housing and those on the shaft 7 being arranged in the lower chambers.

The rotors in each housing contact with each other, as shown in Figure 2, and each rotor is formed with a projection 11 which contacts the wall of the chamber and with a notch 12 which is arranged adjacent the projection, these projections and notches being so formed that the projection of one rotor will enter the notch of the other rotor as the projection carrying parts of the two rotors come together, so that the projections will not interfere with the revolutions of the rotors.

The shafts are geared together by the gears 13 and the shafts rotate in opposite directions, as shown by the arrows in Figure 2. Thus the steam flowing into each housing at the point of junction of the two chambers thereof will expand in the space formed by the two projections and the expanding action of the steam, acting on the projections, will cause the rotors to revolve, the projections moving away from each other. The steam will continue to act on the projections until the projections come opposite the exhaust port 6, when the steam will escape through said port, but the momentum of the parts will cause the rotors to continue to revolve until the projections pass each other and uncover the inlet port, when the steam will again act on the projections to continue the movement of the rotors.

In order to intermittently supply the steam to the housings, I provide a valve casing 14 at the inlet side of the two housings, this casing being in communication with the ports 5 and is connected to a steam supply by a port 15. A cylindrical-shaped valve member 16 is arranged in the casing and has its central part closed by a partition 17 which is keyed at $x$ to a shaft 18 which is shiftable, longitudinally of the casing, the key engaging a slot 19 in the shaft so that the valve member has sliding movement therewith and is held, by the key, against rotative displacement with respect thereto. The ends of the valve member are open, and it is provided with two ports 20, one adjacent each end thereof. The ports are arranged on opposite sides of the valve member and one port is of gradually increasing width from a point adjacent its inner end to its outer end while the other port is of gradually increasing width from a point adjacent its outer end to its inner end, as clearly shown in Figure 5.

The shaft 18 which passes through the valve member is connected by the gears 21 with the upper shaft 8 and said shaft 18 is slidably supported and is moved longitudinally by the hand lever 22 which is connected with one end of the shaft by the grooved collar 23 and the pin carrying collar 24 so that the shaft can be moved longitudinally by the lever without interfering with its rotary movement. The gear 21 on the shaft 18 is slidably but non-rotatably connected with the shaft. Suitable housings 25 are provided for the gears 13 and 21. The shafts are provided with anti-friction means 26 and a pulley 27 is fastened to a projecting end of the shaft 7.

From the foregoing it will be seen that during the rotary movement of the valve member 16, it will first deliver a supply of steam to one housing so as to cause the rotors therein to revolve and then, after the valve member has made a half revolution, its other part will come opposite the inlet port 5 of the second housing so that a supply of steam will be delivered to this housing. The amount of steam supplied to each housing can be regulated by moving the valve member and its shaft longitudinally so as to bring different parts of the ports 20 opposite the ports 5, it being understood that the rectangular portions 20' of the ports will permit a less amount of steam to enter the ports 5 than will the wider portions of said ports 20, as the wider portions will cause the ports 5 to remain open for a longer period of time than will the rectangular portions.

As will be seen, the expansible action of the steam will act on the projections or vanes of the rotors for over a half revolution of each rotor so that the maximum force of the steam is utilized to propel the rotor. The steam will expand in opposite directions and thus act on both projections or vanes and drive the rotors in opposite directions. By making the valve member with its ends open, the valve member is balanced and there is no danger of a thrust action taking place due to the steam acting against said ends.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:—

A valve mechanism for a rotary engine comprising a cylindrical body having means for its communication with cylinders of the engine at one side thereof, a cylindrical-shaped valve arranged in the body, said valve having opposite open ends and also ports on opposite sides thereof intermediate of its ends, each port being of a gradually increasing width from one end to the other, a partition formed medially in said valve for separating the ports in the latter, a supply pipe communicating with the cylindrical body spaced from said means, a shaft centrally of said valve and carrying the same, a hand lever for shifting said shaft longitudinally of the cylindrical body, and means for rotating the shaft and having driven connection with said engine.

WILLIAM W. BROWN.